(12) United States Patent
Pankratov (10) Patent No.: US 8,296,437 B2
(45) Date of Patent: Oct. 23, 2012

(54) SERVER-MEDIATED SETUP AND MAINTENANCE OF PEER-TO-PEER CLIENT COMPUTER COMMUNICATIONS

(75) Inventor: Alexandre Pankratov, Burnaby (CA)

(73) Assignee: LogMeIn, Inc., Woburn, MA (US)

( * ) Notice: Subject to any disclaimer, the term of this patent is extended or adjusted under 35 U.S.C. 154(b) by 444 days.

(21) Appl. No.: 11/642,272

(22) Filed: Dec. 19, 2006

(65) Prior Publication Data

US 2007/0157303 A1    Jul. 5, 2007

Related U.S. Application Data

(60) Provisional application No. 60/754,302, filed on Dec. 29, 2005.

(51) Int. Cl.
*G06F 15/16* (2006.01)
(52) U.S. Cl. .......... 709/227; 709/228; 709/229
(58) Field of Classification Search .......... 709/227–229; 340/825.01–825.04
See application file for complete search history.

(56) References Cited

U.S. PATENT DOCUMENTS

| | | |
|---|---|---|
| 5,586,257 A | 12/1996 | Perlman |
| 6,704,786 B1 | 3/2004 | Gupta et al. |
| 7,380,011 B2 | 5/2008 | Li et al. |
| 7,441,270 B1 | 10/2008 | Edwards et al. |
| 7,558,862 B1 | 7/2009 | Tyukasz |
| 2003/0112823 A1 | 6/2003 | Collins et al. |
| 2003/0221009 A1 | 11/2003 | Standridge et al. |
| 2004/0003247 A1 | 1/2004 | Fraser et al. |
| 2004/0139228 A1 | 7/2004 | Takeda et al. |
| 2004/0148406 A1 | 7/2004 | Shima |
| 2005/0071481 A1 | 3/2005 | Danieli |
| 2005/0076128 A1 | 4/2005 | Tsai |
| 2006/0039356 A1* | 2/2006 | Rao et al. .......... 370/352 |
| 2006/0182100 A1* | 8/2006 | Li et al. .......... 370/389 |
| 2008/0052400 A1 | 2/2008 | Ekberg |

OTHER PUBLICATIONS

Ford et al., Peer-to-Peer Communication Across Network Address Translators, Proceedings of the 2005 USENIX Technical Conference.

Takeda, "Symmetric NAT Traversal Using STUN," Internet draft, Jun. 2003.

* cited by examiner

*Primary Examiner* — Peter-Anthony Pappas
*Assistant Examiner* — Umar Cheema
(74) *Attorney, Agent, or Firm* — David H. Judson (57) ABSTRACT

A method and apparatus for facilitating communication between client computers is provided. The method provides for the use of ping probing by a server to determine the types of NAT devices and/or firewalls protecting the client computers. Once these are determined, the server can predict the response to communications from the client computers and instruct the client computers to contact each other. Once a session or tunnel is established it can be maintained through the use of a flag, even if contact with the server is lost.

18 Claims, 1 Drawing Sheet

SERVER-MEDIATED SETUP AND MAINTENANCE OF PEER-TO-PEER CLIENT COMPUTER COMMUNICATIONS

This application is based on and claims priority to Ser. No. 60/754,302, filed Dec. 29, 2005.

BACKGROUND OF THE INVENTION

1. Technical Field

The invention applies to the field of computer networking, and more particularly to virtual private networking, network traffic tunneling, and network traffic relaying.

2. Background of the Related Art

The Internet and the core Internet Protocol ("IP") have become the ubiquitous format used by modern computer communication systems. The IP provides for network node addressing, IP datagram routing and delivery services. IP also forms a foundation for more elaborate communication services, such as those implemented by Transmission Control Protocol ("TCP") and User Datagram Protocol ("UDP"). There are two major versions of IP, version 4 and version 6.

Internet nodes are identified by their IP network addresses. An IP network address is assigned to every node that participates in a network communication. This address has 32 bits and is commonly represented in a form of 4 octets separated by dots, for example 134.10.210.97. Every network packet sent over IP network includes the IP address of both the source and the destination. In addition, the packet may include both source and destination port numbers. Therefore, if the IP address identifies the computer on the network, the port identifies the particular program on the computer, for example, if the computer is running both a web server and email server, another computer may use port number 80 to direct a web packet to the web server program and port number 25 to direct email data to the email server program.

The Internet, currently comprised of billions of computers, has grown substantially in the last few years and the number of available IP addresses is diminishing, to the point where there is a shortage of available IP addresses. Faced with this shortage, organizations and individuals frequently opt to share a single Internet IP address between two or more computers. The technology to use this sharing is called Network Address Translation ("NAT").

NAT allows multiple computers to share a single IP address. NAT operates by placing multiple computers on an internal network, assigning each computer a "private" IP address that is unique only within the internal network and configures them to access the Internet via a NAT device. The term NAT device, as used herein, refers to devices that dynamically modify the IP addresses found in IP packets sent by the computers in an internal network to make it appear that the internal computers are accessing the Internet from their shared address (and not the private IP address used in internal network). The NAT device may also modify port numbers if at some point more than one computer on the internal network uses the same local port number when sending packets to the Internet. In some other cases, the NAT device may also modify port numbers as dictated by internal NAT device logic. The NAT device stores or "remembers" how it modifies outgoing packets, so it is capable of uniquely identifying an internal computer when it receives a packet in response from the Internet. The NAT device then reverses the changes and forwards the packet to the appropriate computer on the internal network.

A default NAT configuration may cause a number of problems. For example, a computer using a NAT device (referred to as an "internal computer") may be impossible to access from the outside (i.e. the rest of the Internet). This is because a computer on the Internet cannot address an internal computer unless it first receives some traffic from latter, meaning that internal computers cannot act as servers. Furthermore two computers, each using a different NAT device, cannot communicate with each other because neither will receive new connections from computers outside of their respective internal networks.

As computers with Internet connections are vulnerable to virus infections and other attacks, it is considered good practice to implement network access control for such computers. This practice is driven by the rise of computer viruses, privacy issues and general need for network security. The access control is enforced by a firewall, which can be a standalone hardware device or implemented as software.

Firewalls protect a computer against dangers on the Internet. Firewalls monitor or "police" all packets that are sent from or to the protected computer(s) and filter out those portions of packets that violate the applicable firewalling policy. Most commonly such policy is set to allow all packets (also referred to as "traffic") to be sent from the computers to the Internet, but only permit return traffic to the computer that is related to packets previously sent out. This process is known as stateful firewalling as the firewall is required to remember the state of the computer(s) activities to determine if traffic is permitted to reach the computer.

Firewalls may present obstacles in Internet communications. Computers protected by a firewall may be difficult to communicate with from outside the firewall even when such accessibility is desired by the protected computer. In order for the computer behind a typically configured stateful firewall to accept a connection from an outside computer (for example, to act as a server), the firewall configuration needs to be adjusted for that particular computer. This can be a major inconvenience if there are several computers protected by the firewall and their need to establish communications outside the firewall change frequently.

Given the above, NAT devices, firewalls and other such policing devices (sometimes referred to herein generally as "traffic policing devices") may restrict network connectivity in circumstances where such connectivity is desired. Working around these restrictions requires reconfiguration of the traffic policing device on an "as needed" basis, which is frequently not a viable option.

A virtual private network ("VPN") is a secure virtual (as opposed to physical) network. The IP addresses used in a VPN may be independent from those used for Internet communications. Virtual private networks are used to create a private communication environment for computers that may not be in the same physical location. A VPN setup typically uses existing public network infrastructure, such as the Internet, for carrying data between VPN members. For example, VPNs can be used for building a large intra-company network that spans multiple offices. Computers within a VPN are referred to as "members." The configuration of a VPN can be very complex and time consuming and may require superior knowledge of networking and security.

A VPN used in association with NAT can present particular difficulties. The protocols used to implement VPNs include IPsec protocols, various tunneling protocols (L2TP, PPP and others) and application level protocols like SSL and SSH. Early versions of IPsec protocols did not work with NAT at all, but recent extensions, while usable with NAT, lack flexibility and are typically difficult to setup.

VPN connections (also known as tunnels) cannot be established towards a computer using a NAT device without explicit re-configuration; they can only be initiated by such computers. Such tunnels also cannot be established between two computers, each using a NAT device unless at least one of the NAT devices is configured explicitly for this purpose.

There are several techniques available to overcome the above-described problems. For example, external access to a computer residing behind a NAT device may be provided by using port forwarding. This requires the NAT device be configured to associate a particular Internet IP address and/or port number with a specific internal computer. All traffic that the NAT device receives from the Internet for this IP address/port is then forwarded to the specific internal computer. There are two drawbacks to this approach, namely that it is technically complex; and not all types of traffic can traverse a NAT device in this manner.

An alternative solution is known as UDP hole punching, which works as follows. An internal computer (A) sends out an initial UDP packet to an Internet computer (S). As the packet traverses the NAT device, its source port and/or IP address are modified. Computer S notes these modified IP and port numbers and sends them to the peer of A, namely computer (B), which may also reside behind its own NAT device. Computer B goes through the same procedure. In this way, both A and B learn external (i.e., post-NAT, Internet-facing) IP/port numbers of each other, and they try to communicate to each other via these IP addresses and ports. The process of sending a packet to the Internet computer is commonly referred to as "hole punching" as it creates a mapping in the NAT device state and allows an internal computer to start receiving traffic from the peers outside the NAT (namely, through the hole punched in the NAT). This process is based on a number of assumptions about NAT behaviour, which often do not hold true for NAT devices. For example, NAT devices implement different strategies for selecting an external (also known as "mapped") port when sending traffic out. Some NAT devices use different port values depending on the destination IP/port (also referred to as "non identity-preserving NAT"). Thus, the system as described above can be made to statistically work in approximately 80% of all cases where it can be applied, which results in an high failure rate.

An alternate solution in the art is to cause the internal computer to establish communications with an Internet computer, which then can relay traffic between internal computers that are in communication with it. This approach has two major drawbacks; it introduces latency in the communications; and it results in substantial bandwidth expense at the relay Internet computer.

There are still other ways of solving the VPN and NAT problem. One is use ad-hoc VPN systems that are limited to setting up tunnels towards computers not using a NAT device. This solution means that a computer cannot establish the tunnel towards a computer using a NAT device but must wait for that computer to initiate the tunnel. Another approach is a NAT having a VPN pass-through option, which allows one internal computer using the NAT device to receive VPN connections from outside. Still another approach is a centrally-managed VPN system that may include VPN management software that establishes and maintains connections to all VPN members and can command such members to perform certain actions. In particular, the management software can instruct a VPN member using a NAT device to initiate a tunnel towards another member when the latter requires it. This resolves the problem of ad-hoc VPNs, but it does not address tunneling between two computers, both using NAT devices. In another approach, centrally-managed relayed VPN systems may include a software component known as a concentrator, which maintains tunnels to VPN members and may forward traffic to computers using the tunnels. This solution solves the problem of connecting two computers that are each using NAT devices, however, two drawbacks to this approach include extra latency and substantial bandwidth expense for the concentrator.

There remains a need to address these and other problems of the prior art.

BRIEF SUMMARY OF THE INVENTION

The system and method according to the invention simplifies virtual private network setup and enables users with no or minimum experience in computer networking to perform this operation. Furthermore, the system and method according to the invention improves and extends UDP hole punching technology such that the chances of successfully connecting two computers, each using a NAT device, significantly increases.

A technical advantage of the present invention is provided in one embodiment by methods and systems that establish direct low-latency tunnels between VPN members protected by NAT devices. In general, this advantage is provided by a secure mediated peer-to-peer system that comprises a mediation server and end-node peer clients. The mediation server tracks client locations and provides mediation services required for establishing direct peer-to-peer tunnels between client nodes.

The present invention thus provides for server-mediated setup and maintenance of a tunnel between or among a set of peer computers. In one embodiment, it is assumed that a service provider provides a virtual private networking service whereby at least first and second peer nodes (typically, end user machines) use the help of a third node (a mediation server) to locate each other and to facilitate the connection between themselves. Once established, the connection between the peer nodes is direct; preferably, no end user traffic flows through the mediation server. In this manner, the service provider provides a peer-to-peer connection service that enables any two (or more) computers with an Internet connection to organize themselves into their own virtual network for direct secure communications. Thus, as used herein, a "peer-to-peer" connection may connect two or more end user computers, and communications may occur between two such computers or among two or more such computers. There may be multiple instances of the mediation server running to provide reliability, scalability and high availability of the service. Preferably, the mediation server executes a tunneling engine that facilitates a set of discovery, port prediction and tunnel setup functions as are now described.

Assume that client A (a first peer) desires to have a secure tunnel established to client B (a second peer). Both A and B can execute the commands of the mediation server's tunneling engine. A connection process begins when client A establishes a connection to one of the mediation servers. If necessary, the mediation server instructs client A to go through a NAT type discovery process. In particular, if discovery is needed, client A establishes a session with the mediation server, which in turn instructs the client to issue the set of (preferably) three (3) UDP probes to the set of probe targets (e.g., ip_address_1, port1, ip_address_2, port2 and ip_address_1, port3). The purpose of the discovery process is to enable the mediation server to understand exactly how the client's NAT device modifies (or "mangles") the source port number and/or IP source address when the packet passes through it from the LAN to the Internet. This NAT device logic may be dependent on the value of the destination port, it may depend on the value of the destination address, or it may depend on some other session and/or configuration parameters. By performing discovery, the mediation server can determine the NAT mangling logic, which in turn enables the server to more accurately predict the port that will be used to set up the peer-to-peer tunnel. During the discovery process, the mediation server may also check the client's firewall to determine if it is stateful or not. Of course, a similar discovery process may be carried for client B, if necessary.

It is now assumed that discovery (whether performed concurrently or previously during the session) is complete. As a result of the discovery process, the mediation server now knows each client's mapping/firewall type. The mediation server then generates a set of one or more scripts that will be used to carry out a tunnel setup sequence. Each script in the set of one or more scripts comprises a series of tunnel setup steps, preferably as follows: (a) updating client address/port information, (b) predicting the port(s), (c) preparing the tunnel, and (d) confirming the tunnel. Once the set of one or more scripts are generated, the tunnel engine on the mediation server iterates through each script sequentially executing steps (a)-(d) (for each script) until either the tunnel is set up or there are no more scripts to try. Preferably, the tunnel engine advances to a next step (in a given script) only when a current step is completely executed. Thus, for example, if a given step in a given script fails to complete, the script is considered failed and the engine advances to the next script if there is one.

Step (a) updates client address/port information for one or both clients. It is thus a per-client setting. Preferably, the mediation server performs this update by asking the given client to send a single probe to the mediation server or other backend machine. If the server(s) do not receive this probe in a given time, the mediation server assumes the probe packet was lost and asks the client to re-send (e.g., up to a given number of tries).

Step (b) occurs if the IP/port needs to be predicted. This is a per-client setting. This step typically involves no traffic; rather, the mediation server uses the information is has obtained during the earlier data collection processes to guess the next port the given client is going to use.

Step (c) prepares the tunnel and is also a per-client setting. In certain cases the mediation server will ask a given client to send a packet towards its peer. This step may also specify a TTL (time to live) for the packet.

Step (d), tunnel confirmation, is unconditional and is always executed. When a script reaches this step, the tunnel engine already knows what IP/port numbers both clients will be using towards each other; the mediation server uses this information to ask client A to send a probe to client B, and to ask client B to send a probe to client A. If, as described above, the mediation server then receives a probe reflection packet, the server has confirmed that the tunnel is operational in a respective direction. Once the mediation server receives both reflections, the server knows the tunnel is fully operational. The mediation server then completes the setup sequence by notifying the clients.

Thus, according to the present invention, a method is operative in a server to facilitate a connection between a first client and a second client. The method begins by having the server instruct each client to execute a packet exchange protocol by which the server determines an associated Internet access type for the client. This is the discovery phase. Based on the Internet access type for the clients, the server executes a tunnel setup protocol by which it attempts to set up a tunnel between the first client and the second client. This is a tunnel setup phase. If the tunnel setup protocol succeeds, the server provides each client with the IP address/port number of the other client so that the first client can start exchanging data with the second client directly through the tunnel and without passing through the server. This is a data communication phase. If the tunnel setup protocol does not succeed for some reason, the server instructs the first and second clients to communicate with one another via a relay node.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

The system and method according to the invention is a virtual private networking system that uses traditional VPNs, assisted NAT traversal (namely, UDP hole punching), proxy traversal (also known as HTTP and SSL tunneling), and/or relays.

One aspect of the method and system includes a modification of the existing UDP hole punching technique that significantly improves it effectiveness; the combination of the above technique with UDP and TCP relaying techniques to provide connectivity between most computers with Internet access; the client presence tracking framework for a server, client computers and relays; and the combination of above with virtual private networking providing for zero-configuration virtual private networking.

Figure 1:
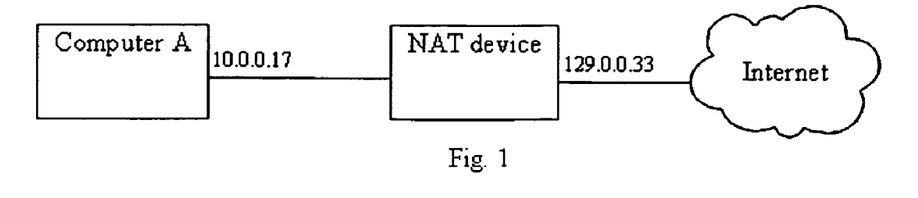
FIG. 1 is a block diagram showing a computer protected by a NAT device.

As seen in FIG. 1, client computer A is using NAT device N to access the Internet. Client computers are conventional computers having a processor, read only and random access memory, input means and output means. In this application, the term "client computer" will encompass any computer with access to a wide area network, and also a program operating on such a computer. Such a computer may, but need not, operate on a local area network, and may perform the functions of a server on the wide area network. The computers communicate with each other and the Internet and NAT devices and firewalls via modems, T1 lines, ADSL and the like. In the example shown client computer A has an IP address of 10.0.0.17, although other IP addresses may be used. NAT device N allows client computer A access to the Internet. NAT device N is shown as having an external IP address of 129.0.0.33, although other IP addresses may be used.

Figure 2:
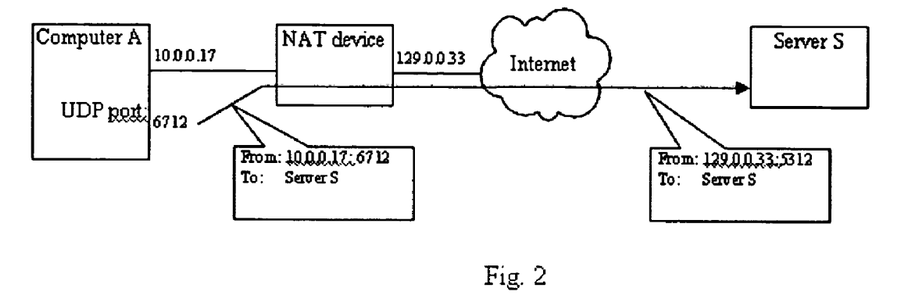
FIG. 2 is a block diagram showing a hole punching process.

As seen in FIG. 2, a program on client computer A allocates a local UDP port and uses it to send a UDP packet to server S. This local UDP port is known as client computer A's internal port. In FIG. 2, the internal port is designated as 6712. When the packet arrives at server S, its source IP address is set to NAT Device N's external IP address and the source port of the packet may or may not be client's computer A's port. This port is referred to herein as A's external port.

Existing UDP hole punching technique requires that the value of an external port depends solely on the source address and the source port designated in the packet. Therefore if client computer A uses the same internal port to send the packet to an Internet computer other than server S, NAT Device N will designate the same external port it used when sending packets to server S. NAT devices of this type are sometimes referred to as identity-preserving.

Figure 3:
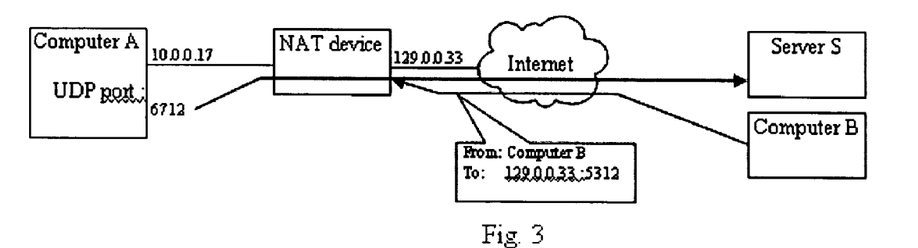
FIG. 3 is a further view thereof.

Using this method, as seen in FIG. 3, any Internet computer (for example, client computer B) should be able to address a packet to a program on client computer A by sending a UDP packet to the external port designated by NAT device N.

In standard UDP hole punching NAT device N may or may not allow this unsolicited access. Typically, NAT device N inspects where such inbound packet comes from and compares its source IP address (e.g. client computer B's IP address) to the list of those IP addresses to which client computer A has actually sent packets. In such situations, server S can act as a mediator connecting client computer A to client computer B. In such a case, first, client computer A and client computer B each send a UDP packet to server S, so that server S obtains their external ports. Next, server S sends client computer B's external IP address and port to client computer A and client computer A's external IP address and port to client computer B. Then, client computer A sends a packet to client computer B and thus creates a proper entry in NAT Device N's connection list. Client computer A is thereby said to punch a hole in NAT Device N. After these steps, client computer B is able to transmit packets to client computer A using client computer A's external port.

The above described technique can be used when both client computer A and client computer B are behind different NAT devices. In such a case, the sequence of steps includes client computer B sending a packet to client computer A. Depending on the timing of client computer A's and client computer B's transmissions, either packet or both packets may be rejected by a NAT device or may be delivered to its intended recipient. These are disposable packets used for punching a hole and their loss is expected.

According to some statistics, the above approach is successful in about 80% of all cases where both peers (client computer A and client computer B) can send UDP packets to Internet hosts. Furthermore, this technique can be used to connect computers behind stateful firewalls that are configured for unrestricted outbound UDP and permit related inbound traffic.

The method and system according to the invention extends traditional UDP hole punching to support NAT types, for example, that are not identity-preserving. An initial discovery process is used to determine the presence and type of NAT or firewalling device being used by the client computers. This method according to the invention is sometimes referred to herein as assisted NAT and firewall traversal ("ANFT"), although this designation should not be construed to limit the invention, which can be practiced in association with clients that access the Internet through any type of traffic policing device. An ANFT server is an Internet accessible computer that clients using ANFT use to assist in transmitting packets to each other. This server is sometimes referred to herein as a "mediation" server.

Figure 4:
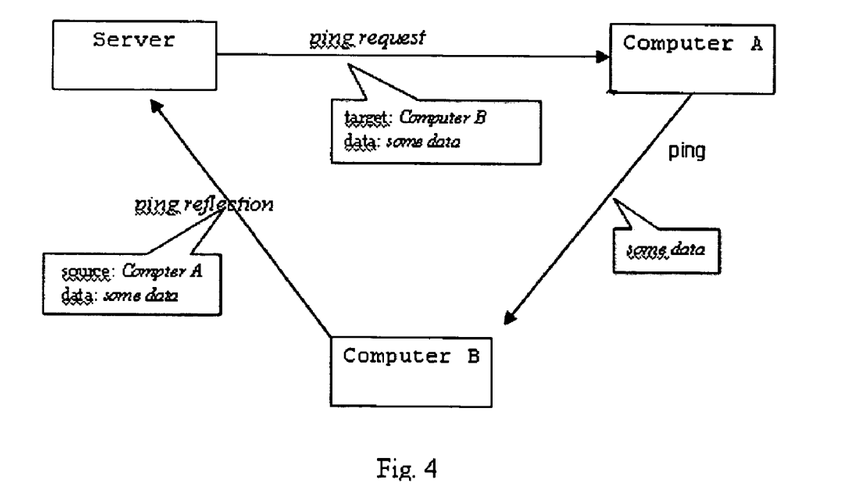
FIG. 4 is a block diagram showing a probing process.

Preferably, ANFT uses a packet exchange method referred to herein as ping probing, which is now described. Ping probing preferably includes three transmissions, as seen in FIG. 4. In the first transmission, server S transmits a packet, referred to herein as a ping request packet to client computer A. The ping request packet contains the address and the port of the computer B and some data, where computer B has a communication channel to the server S. The ping request packet is sent via TCP or UDP. The next transmission is client computer A sending a packet, referred to as a ping packet, to the address (computer B's address) and with the payload (data) specified in the ping request packet. The ping packet is sent via UDP. The third transmission is computer B sending a packet, referred to as a ping reflection packet, to server S. The ping reflection packet contains the source address and the port of client computer A as determined by computer B using the ping packet and the data from the ping packet. The ping reflection packet typically also is sent via TCP or UDP.

Server S uses this exchange to learn the state of the port mappings on the NAT devices in front of client computer A and/or to verify that computer B is reachable from client computer A at a certain IP address and port. In particular, when the client A initially connects to the Server S it opens up and binds to a local (to client A) socket (a "/local/UDP socket"), and the client A operating system obtains a local IP address and port number in the usual manner. The local IP address and port numbers are passed up to Server S, which then issues client A the ping request packet containing the address and the port of computer B, as described above. Client A's NAT (or other traffic policing) device (its mangling logic) modifies this local IP address and port when client A issues the ping packet to computer B. Computer B, as noted above, returns the ping reflection packet to Server S, and this packet contains the source address and port number of client A as seen by computer B. By comparing the local IP address and port number (obtained from client A) with the address and port information as seen by computer B, Server S can identify how the NAT device logic has modified the local source information. While one such packet exchange provides Server S with information that is useful in characterizing the NAT device, Server S can obtain a more accurate identification of the precise mangling logic used by the NAT device by running several such packet exchanges, with each exchange being directed to a different target location. In a preferred embodiment, three (3) such exchanges are executed, although this is not a requirement, especially for characterizing certain NAT devices.

Preferably, ANFT uses two parameters to categorize a client computer's type of Internet access, referred to herein as the mapping algorithm and the firewall type. The mapping algorithm of the client computer (or its NAT device) is categorized as static, port_n, port_burst, port_random and addr_random. Preferably, two boolean flags, referred to as per_ip and delayed, are also used, as is a variable known as step value. Static type means that external port number used by a client computer depends only on its internal address and port number. An identity-preserving type of NAT device would be in this category (or the case where no NAT is used at all). Port_n means that external port used changes in fixed increments or decrements (n) of one or more for each new destination IP address and port. Port_burst means that the external port used changes in random increments or decrements that are bound by a fairly small value (for example, an upper bound of twenty). Port_random means that the external port used is selected randomly for each new session. Addr_random means that both the external port and IP address may change for each new destination. The manner in which the change is made is irrelevant. This usually indicates a presence of a load-balancing NAT device. Per_ip flag applies to port_n and port_burst types and indicates if the external port depends only on the destination address (indicated as one or true) or both an address and the port value (indicated as zero or false). Delayed flag applies to port_n and port_burst types and indicates if the external port overloading process applies to all sessions originating from a given source port (indicated as zero or false) or only to the second and following source ports (indicated as one or true). Step value defines the port change value for port_n type and the range of the burst for port_burst type. This value may be negative meaning that port value is decreasing with usage.

In an illustrated embodiment, firewall types are categorized as either open or stateful and these categories are applicable in the case of static mapping algorithms. The firewall type is categorized as open if a computer can send a UDP packet to the external port and it will be delivered to the appropriate application on a target computer. Preferably, the firewall type is categorized as stateful if only computers previously contacted by the computer using the firewall may communicate with the protected computer via the external port.

ANFT may be used for communications between computers with the combinations of client mapping/firewall types as shown in Table 1 below.

TABLE 1

|  | static.open | static.stateful | port_n | port_burst | port_random | addr_random |
| --- | --- | --- | --- | --- | --- | --- |
| static.open | yes | yes | yes* | yes* | yes* | yes* |
| static.stateful | yes | yes | yes* | yes* |  |  |
| port_n | yes* | yes* | yes* |  |  |  |
| port_burst | yes* | yes* |  |  |  |  |
| port_random | yes* |  |  |  |  |  |
| addr_random | yes* |  |  |  |  |  |

The items with an asterick indicate combinations that are not supported by standard UDP hole punching.

The items with an asterisk indicate combinations that are not supported by standard UDP hold punching.

Server S uses ping probing as previously described to determine the categories of the NAT device and/or firewall of the client computers. In a typical discovery phase (in which the categories of a client computer are determined), preferably the following process occurs:

Preferably, the discovery is performed by server S sending a batch of three (3) ping requests to the client computer. The address field in these requests preferably is set as follows:

$1^{st}$ ping request—IP_address_1, Port_1
$2^{nd}$ ping request—IP_address_2, Port_2
$3^{rd}$ ping request—IP_address_1, Port_3 where IP_address_* are the addresses of the ping targets that communicate the ping reflections to server S. The ping target can be characterized by any IP_address and Port_number combination; thus, a set of ping targets can be located at the same IP_address but have different ports. More generally, the ping targets need not be potential peers but may be any given machines that execute the discovery application. These machines may be associated with a service provider that is providing a server-mediated peer-to-peer connection service according to the present invention. By comparing the information contained in the ping reflections received by server S, the client computer's NAT device and/or firewall can be categorized.

In particular, and by way of example only, assume that the three (3) reflection packets received from the client indicate that ping packets were received from ip1/port1, ip2/port2 and ip3/port3 address/port combinations. If all IP addresses and all port numbers are the same, the client resides behind (in AFNT notation) a /static/ NAT device. If the IP addresses are the same and port numbers are spaced at an equal interval, however, then the NAT type is /port_n/. Additionally, prior to entering the discovery phase, as noted above, preferably the client creates and binds a /local/ UDP socket. This socket preferably remains open throughout the discovery phase, and it is also used for all UDP tunneling later on. Thus, in effect, the discovery process determines how NAT and firewall logic applies to the traffic sent through this particular client socket. The client also reports an IP address and the port number of this socket to the server when the discovery process starts. By comparing the /ip1/ value in a ping reflection to the /local/ IP address reported by the client, the server can determine if there is NAT device or if the client is connected to the Internet directly. Similarly, by comparing the /local/ port number to the /port1/ and /port2/values, the server can detect the case of a /delayed/ NAT type. The type of the firewall preferably is determined by sending a ping packet to the client's external IP/port from the address/port combination that has not yet been used by the server for this client. If the server receives the ping reflection back, then the firewall type is /open/, otherwise it is /static/.

In general, preparing a connection setup between two client computers using ANFT preferably includes discovery, prediction and confirmation, as will not be further described.

Discovery is the first step in preparing the connection setup using the ANFT method. As described previously, the server instructs the client computer to execute ping probing using a set of IP address/port values. The server then analyzes the source addresses from the ping reflections received and determines the appropriate mapping type category as described previously.

If the client computer's mapping type is categorized as static, the server then checks the type of the firewall by sending aping packet to the client computer from an IP address and port not previously used for communicating with the client computer. If the client computer sends a ping reflection packet back, the NAT/firewall is categorized as an open type, otherwise it is categorized as stateful.

The discovery process may include multiple rounds of ping probing to compensate for the presence of lossy connections. The server also determines the client computer's internal address and port during the discovery process; these are used to differentiate between a client computer using a static NAT device and a client computer without a NAT device. Internal address/ports are also used to detect and handle the case of two client computers behind the same NAT device.

During discovery, the client may report it is utilizing port forwarding to map a UDP port on an external interface of the NAT device to the local port that it is using for UDP communication. In this case, the discovery process proceeds with a port mapping activation step that involves the server sending a ping packet to client's external IP and the port number. If the client does not report the value of its externally visible port, the ping is sent to client's /local/ port (and its external IP address).

The prediction process works by the server predicting which external port a client computer will use when it initiates communications with another client computer. If the external port can be predicted with a high degree of accuracy, then the client computers may be instructed to contact each other and be able to communicate directly.

Preferably, the server predicts ports by looking at the category of the client computer's mapping type. As noted above, the port can be predicted for static and port_n types, and the range of ports can be guessed for port_burst type. Preferably, port prediction involves executing ping probing to learn the current port mapping state of NAT device.

Depending on the combination of client computer types, it may be sufficient to predict a port for just one client computer; alternatively, predicting ports on both client computers may be required or desired.

A confirmation step is used to activate the tunnel between the client computers using the predicted ports and to verify that the tunnel operates in both directions. In particular, preferably the server uses ping probing packets to instruct one or both client computers to communicate with the other, either sequentially or simultaneously. It then observes the source information in the ping reflection packets to validate and possibly correct the prediction and confirm the tunnel between the clients. Thus, in a preferred embodiment, the server asks client A to ping client B; likewise, the server asks client B to ping client A. The server then observes the source information in the reflection packets to confirm the tunnel.

The server may also use short time-to-live (TTL) ping packets to create the required mappings in a NAT device, and also to ensure that the packets used for this purpose do not reach another client's NAT device.

Once this step is complete, the server either determines the tunnel is operational or that the tunnel is not setup. In the first case, the client computers are provided with the other's confirmed external IP/port addresses and they may immediately start exchanging data through the tunnel.

The following provides a more detailed explanation of a server-mediated setup and maintenance of a tunnel between or among a set of peer computers according to the present invention. In one embodiment, it is assumed that a service provider provides a virtual private networking service whereby at least first and second peer nodes (typically, end user machines) use the help of a third node (a mediation server) to locate each other and to facilitate the connection between themselves. Once established, the connection between the peer nodes is direct; preferably, no end user traffic flows through the service provider's servers. In this manner, the service provider provides a peer-to-peer connection service that enables any two (or more) computers with an Internet connection to organize themselves into their own virtual network for direct secure communications. For illustrative purposes only, the following discussion describes how first and second end user machines may use the mediation server but it should be understood that any number of end user machines may establish their own virtual network. Thus, as used herein, a "peer-to-peer" connection may connect two or more end user computers, and communications may occur between two such computers or among two or more such computers. Also, as used herein, the mediation server may execute as a process on a single machine or it may operate across multiple machines in a distributed manner. There may be multiple instances of the mediation server running to provide reliability, scalability and high availability of the service. A set of mediation servers may be load-balanced in any convenient manner. Also, typically the service provider has one or other backend machines whose operating characteristics are known to the service provider and that can be used to facilitate the connection setup and maintenance process, as will be described. As noted above, the mediation server preferably executes a tunneling engine (e.g., a computer program or application comprising a set of computer-executable instructions) that facilitates one of more of the functions that are now described. To facilitate the packet exchanges described above, a given client (or other computer acting as a probe target) typically includes a lightweight probe packet handling routine. This routine is responsive to commands issued by the server tunneling engine including, without limitation, by those in the form of ping request and ping packets. Peers do not need to run the tunneling engine.

In general, a secure mediated peer-to-peer system according to the invention comprises a mediation server and end-node peer clients. The mediation server tracks client locations and provides mediation services required for establishing direct peer-to-peer tunnels between client nodes.

Assume that client A (in a first peer) desires to have a secure tunnel established to client B (a second peer). As noted above, both A and B execute commands from the server's tunneling engine. A peer may need to register for the service to obtain the tunnel engine. A connection process begins when client A establishes a connection to one of the mediation servers. If necessary, client A goes through a discovery process such as described above. In particular, if discovery is needed, client A establishes a session with the mediation server, which in turn instructs the client to issue the set of (preferably) three (3) pings to the set of ping targets (e.g., ip_address_1, port1, ip_address_2, port2 and ip_address_1, port3). As noted above, the purpose of the discovery process is to enable the mediation server to understand exactly how the client's NAT device modifies the source port number when the packet passes through it from the LAN to the Internet. This NAT device logic may be dependent on the value of the destination port, the value of the destination address, or some other session and/or configuration parameters. This is why the mediation server typically instructs the client to try different IP addresses as well. The IP addresses may be associated with one or more backend machines, but this is not a requirement. By performing discovery, the mediation server can determine the NAT mangling logic, which in turn enables the server to more accurately predict the port that will be used to set up the peer-to-peer tunnel. Discovery is performed on an as-needed basis as dictated by the application requirements for accuracy and performance. In particular, as described above, the client selects its local IP and port number for all its UDP traffic in the beginning of the discovery phase, and this is the only IP/port combination used throughout the discovery process and thereafter. The discovery process thus determines how the client's associated NAT handles this particular IP/port combination that the client selects. Discovery may be re-run if the client needs or wants to re-select it local/port combination.

As also described above, during the discovery process the mediation server may also check the client's firewall to determine its state (e.g., as being open or stateful). Of course, a similar discovery process may be carried for client B, if necessary. It is now assumed that discovery is complete. The mediation server knows each client's mapping/firewall type. The mediation server then generates a set of one or more scripts that will be used to carry out a tunnel setup sequence. Typically, there will be a set of predefined scripts for each cell in Table 1. Each script in the set of one or more scripts preferably comprises a set of tunnel setup steps, preferably as follows: (a) updating client address/port information, (b) predicting the port(s), (c) preparing the tunnel, and (d) confirming the tunnel. Once the set of one or more scripts are generated, the tunnel engine on the mediation server iterates through each script sequentially executing steps (a)-(d) (for each script) until either the tunnel is set up or there are no more scripts to try. Preferably, the tunnel engine advances to a next step (in a given script) only when a current step is completely executed. Thus, for example, if a given step in a given script fails to complete, the script is considered failed and the engine advances to the next script if there is one.

Step (a) updates client address/port information for one or both clients. It is thus a per-client setting. Preferably, the mediation server performs this update by asking the given client (in this example, A or B, as the case may be) to send a single probe to the mediation server or other backend machine. If the server(s) do not receive this probe in a given time, the mediation server assumes the probe packet was lost and asks the client to re-send (e.g., up to a given number of tries). This probing is typically done if the client has a NAT type of static, port_n or port_burst. In particular, for static type, this update refreshes the mediation server's value of the client's port number (because its NAT device may have expired the mapping due to inactivity). For port_n or port_burst, the probing is required because otherwise the mediation server does not know where the current NAT's external port value is at.

Step (b) occurs if the IP/port needs to be predicted. This is a per-client setting. This step typically involves no traffic; rather, the mediation server uses the information is has obtained during the earlier data collection processes to guess the next port the given client is going to use. This step is not always required.

Step (c) prepares the tunnel and is also a per-client setting. In certain cases the mediation server will ask a given client to send a packet towards its peer. This step may also specify a TTL (time to live) for the packet. This step is not always required.

Step (d), tunnel confirmation, is unconditional and is always executed. When a script reaches this step, the tunnel engine already knows what IP/port numbers both clients will be using towards each other; the mediation server uses this information to ask client A to send a probe to client B, and to ask client B to send a probe to client A. If, as described above, the mediation server then receives a ping reflection packet, the server has confirmed that the tunnel is operational in a respective direction. Once the mediation server receives both reflections, the server knows the tunnel is fully operational. The mediation server then completes the setup sequence by notifying the clients.

The following is a representative set of scripts for clients that discovery establishes as port_n types:

update (A and B), predict (A and B), prepare (A, TTL—2 hops), confirm (B→A, A→B)

update (A and B), predict (A and B), prepare (A, TTL—64 hops), confirm (B→A, B→A)

update (A and B), predict (A and B), prepare (B, TTL—2 hops), confirm (A→B, A→A)

update (A and B), predict (A and B), prepare (B, TTL—64 hops), confirm (A→B, B→A).

As another example, the following is a representative partial set of scripts for clients that discovery establishes are behind the same NAT device:

confirm (A→B, B→A) using A's and B's LAN IP/port numbers confirm (B→A, A→B)

prepare (B, TTL—64 hops), confirm (A→B, B→A) (this pokes a hole in B's firewall)

prepare (A, TTL—64 hops), confirm (B→A, A→B), . . . .

As yet another example, the following is a representative partial set of scripts for the client A of type static.open and the client B of any other type:

update (A), confirm (B→A, A→B), . . . .

Of course, the above scripts are merely representative; they are provided merely to show how the various update, predict, prepare and confirm steps may be carried out to facilitate the tunnel setup process. As noted above, in certain cases (depending on the mapping type/firewall determination), the update, predict and/or prepare steps may not be required.

The method and system according to the invention also allows the use of ANFT with HTTP, SSL and UDP based network relaying to provide connectivity when direct client-to-client tunneling is unavailable. Such cases include: client computers having no UDP access; client computers in lossy UDP environments; and, client computers in combinations not provided for by ANFT (as seen in Table 1).

UDP-based relaying is a process whereby a server instructs a pair of client computers to communicate with each other using UDP protocol via a relay. A relay is a networked computer controlled by the server with the purpose of handling client-to-client traffic, i.e. it receives packets from one client computer and immediately forwards them to another. Preferably, the server issues each client computers a unique relaying ID number, which the client computer must include in every packet sent out. The server also sends these relaying ID numbers to the relay, and the relay will start forwarding the traffic tagged with one of the relaying ID numbers to the client computer that is identified with the other relaying ID number. The client may also be issued a relaying authentication key that it is required to use to digitally sign all packets sent to the relay. In other words, the relay will relay traffic between the clients.

SSL-based relaying is similar in principle and involves the client computers setting up SSL/TLS connections to the relay and using these for exchanging the data between each other.

HTTP-based relaying is again similar and it involves client computers using either a single HTTP connection each or a pair of HTTP connections each to the relay, In the latter case, one of the connections is used for sending data, and another is used for receiving data.

If ANFT (as has now been described above) fails, preferably the mediation server then tries to setup UDP relaying first, SSL relaying next and HTTP relaying last. When there is more than one of the UDP, SSL and HTTP based relaying is successful, the mediation server preferably instructs the client computers to measure RTT (round-trip-time) for each type of relaying and for each relaying server. The server then selects one relay based on various criteria or their combination, including lowest cumulative RTT, and lightest load. The mediation server may periodically re-select the relay for the client computers in response to changes in the relay availability, responsiveness and load.

A presence tracking framework is an arrangement between the server and the client computers that involves the client computers establishing sessions with the server to use the server's services. A client computer that has an established server session is categorized as online, otherwise it is categorized as offline.

Preferably, the sessions are managed via session control protocol, which runs over the reliable data gram in-order delivery protocol. It may be a message framing protocol run over TCP or a reliability protocol added on top of UDP.

The server expects to periodically receive small "keep alive" packets from client computers if the session is left idle for some time. Client computers that fail to keep their session alive are categorized by the server as in an offline state and their sessions terminated. Also, if the server fails to communicate a message to the client computer, the client computer will be set to offline.

Preferably, the server also keeps track of all client computer pairs that have established tunnels with each other.

A client computer is expected to explicitly notify the server by using a logout message when the client computer is about to terminate the session. The server then can terminate the control connection and the client computer is moved into offline mode.

When the client is moved into the offline mode, the server sends a notification to all other client computers that presently have tunnels with now offline client. This notification includes information as to whether the client sent the usual logout message or if the session was terminated unexpectedly (e.g. because the server did not receive the "keep alive" packets). If the session was terminated unexpectedly, a ghost flag in an offline message is set to indicate the lack of the logout message.

When a client computer receives a notification from the server that the other client computer with whom the tunnel had been established is offline and a ghost flag is not set, that client computer removes the tunnel towards the now offline client.

If the ghost flag is set, the client computer receiving the notification keeps the tunnel open and periodically checks it by sending probes to the offline client computer. If the offline client computer does not reply in timely manner, the tunnel is declared dead and removed. However, if the offline client computer replies, it indicates the presence of a transient connectivity problem on the route between the offline client computer and the server, which led to the connectivity loss.

When a client computer unexpectedly loses a connection to the server, preferably it starts sending "keep alive" packets through all of its tunnels. This activity compliments the behaviour of the client computers that receive a notification with a ghost flag set, and therefore they are preferably able to maintain their connectivity with the other client computer. The server need no longer play a role until both client computers are again online.

The mechanism of ghost clients allows client computers to retain the client-to-client connectivity in the event of a server connection loss. The loss may be limited to a single connection to the server, or for all connections to the server, for example, if the server is being restarted.

The method and system according to the invention can be used with a virtual private networking mechanism to implement a "zero-configuration" virtual private networking system. The system includes a mediation server, at least a pair of client computers that desire to communicate, and, optionally, one or more relays.

In particular, in a representative embodiment, the mediation server (which may comprise more than one such server or server process) is responsible for the ANFT process, client presence tracking, client authentication, client grouping and client configuration. The client computers are responsible for emulating a LAN like environment on an end-user machine, communicating with the server and tunneling VPN traffic to/from other client computers through the virtual networks. The relay (if used) is responsible for assisting the client computers communicate in scenarios where the ANFT process fails to establish direct tunnels.

Preferably, when the server is initially configured, a cryptographic identity is generated for it and the public portion (public key) is distributed to each client. A virtual IP range is also selected so the virtual IP numbers do not overlap with any existing IP addresses any client computer may already have.

When the client computer is initially configured, it also generates a cryptographic identity. It then establishes a control session with the server, secures it using cryptography mechanisms, authenticates the server and submits its public identity (public key) for registration. In return, preferably the server allocates a virtual IP address for the client computer and sends it to the client computer. The virtual IP address/cryptographic identity pair becomes part of the client computer's login information.

Once the client has obtained the virtual IP address, it uses it to configure a virtual network adapter. The virtual network adapter is an operating system component that appears as a physical network card to the system, but does not correspond to any actual hardware. Instead, preferably all traffic sent by the system to this adapter is forwarded to an application process. This process then inspects the traffic and either drops it (discards it) or forwards it to the other VPN member(s) via the tunnel(s). The process may also send replies to system requests such as those carried by DHCP and ARP protocols.

When a client computer receives VPN traffic through a tunnel, preferably the client again validates it (a client expects to receive raw network packets, although other types of packets may be sent through the tunnel) and then injects the packet into the virtual network adapter, making it appear to the system as if this traffic was received by the client computer from a real physical wire. The traffic then undergoes regular processing. Therefore, preferably the life of a packet follows these steps. A program on a client computer sends data using its target's virtual IP address. The operating system adds a header to the packet and passes the packet to a virtual adapter for dispatch. The header and the data comprise a packet. The virtual adapter then passes the packet to a forwarding program. The process encrypts (optionally) the packet and sends it to the target computer using its physical IP address. The forwarding program on the target computer receives the packet, decrypts it and checks that whatever was received is a packet. The forwarding program then passes the packet to a virtual adapter. This is sometimes referred to as packet injection. The virtual adapter then passes it to the operating system (as if it received it from a physical wire). Finally, the operating system strips the header from the packet and delivers the data to the forwarding program running on the target computer.

The forwarding program preferably has a back channel for communicating with the virtual adapter. This channel is used by the virtual adapter for delivering virtually-outbound traffic to the forwarding program and what the forwarding program uses to inject virtual-inbound packets into the adapter.

The VPN traffic tunneled between VPN members typically comprises IP and IPX datagrams. Unicast datagrams are sent directly to the recipient VPN member, broadcasts are sent to all VPN members, and multicasts are sent to the members of a given multicast group (or, alternatively, to all members). Support for other types of network traffic and application protocols can be added on as needed basis.

The virtual adapter preferably is configured with a Virtual IP address and a non-trivial subnet that covers the entire Virtual IP address range as configured on the server.

The server decides which client computers require tunnels between themselves based on client computer grouping information. Client computers are grouped together using virtual network configuration objects. A client computer may belong to more than one network. The clients also have per-network online status, meaning that they can toggle their online presence for each network individually.

The network may be either fully-meshed or hub-n-spoke. In a fully-meshed network the tunnels are setup between all online network members. In a hub-n-spoke network, there is one hub member and zero or more spoke members. The tunnels are setup between the hub and each of the spoke members. The spoke members do not have tunnels between each other.

When the server completes a tunnel setup between two clients, it also generates a temporary cryptographic key for use by the clients to secure this tunnel. Shortly after the tunnel setup, the clients run through a cryptographic key exchange, generate their own private secret key and use the private key instead of the server-provided key to secure the tunnel.

To authenticate the key exchange, preferably the client computers look up the other's public key in their trusted key cache. If the key is not found, it is requested from the server and put into an untrusted key cache. The key exchange is then completed, and the tunnel marked respectively (trusted or untrusted).

The trusted/untrusted key caches provide for client computers not trusting the server in its public key distribution capacity. Therefore, preferably every new key the client computer receives from the server must be inspected by comparing a key fingerprint of the client's computer and the sending computer's copies of the public key. Preferably, the key fingerprint is a human-readable string of hexadecimal numbers. The key is then verified using an out-of-band channel. Once verified, preferably the key is moved to the trusted cache.

Traffic that is exchanged by the client computer and the server thus is encrypted, authenticated and protected against replays. Traffic that is exchanged by a pair of client computers is thereby authenticated and protected against replays. Such traffic between a pair of client computers may also be encrypted. Specifics of the cryptographic algorithms used, key sizes, padding types, chaining modes, and the like depend on the prior agreement between the server and the client computer.

The invention described herein provides for a zero-configuration virtual private networking system. It resolves typical VPN setup problems as follows:
  it provides for the presence of NAT devices and stateful firewalls, without requiring NAT/firewall reconfiguration;
  it establishes direct tunnels between members of a VPN (using extensions of UDP hole punching technique), thereby providing fast communication between such members;
  it transparently switches to passing traffic via relays when direct tunneling is not possible, thereby providing connectivity between any computers with Internet access;
  it uses virtual network adaptors to avoid complications caused by NAT breaking up network traffic;
  it uses single private IP address space between all VPN members to avoid address collisions and routing ambiguities, thereby not requiring computer reconfiguration; and
  it handles network broadcasts and multicasts between and among VPN members to fully emulate a LAN environment, thereby allowing standard LAN applications work over the VPN.

The system and method according to the invention simplifies virtual private network setup and enables people with no or minimum experience in computer networking to perform this operation. Furthermore, the system and method according to the invention improves and extends UDP hole punching technology such that the chances of successfully connecting two computers, each using a NAT device, increases from about 80% to a significantly higher percentage.

As previously mentioned, the above described system and method can be implemented as a series of instructions stored on computer readable memory, such as a disc or hard drive, or RAM or other memory. The server and/or client computers may be configured to carry out the methods described above.

As previously noted, the hardware and software systems in which the invention is illustrated are merely representative. One or more of the above-described functions may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. The present invention may be implemented as a managed service (e.g., in an ASP or hosted service model) using the illustrated set of mediation server and backend machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative mediation server machine is a network-based server running commodity (e.g. Pentium-class) hardware, an operating system (e.g., Linux, Windows, OS-X, or the like), an application runtime environment (e.g., Java, .ASP), and a set of applications or processes (e.g., applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Although the particular preferred embodiments of the invention have been disclosed in detail for illustrative purposes, it will be recognized that variations or modifications of the disclosed apparatus lie within the scope of the present invention.

What is claimed is:

1. A method carried out at a server to facilitate a connection between a first client and a second client, the server being distinct from the first client and the second client, comprising:
  receiving, from each client, a local IP address and port number associated with a UDP socket that the client has opened and to which it has bound;
  instructing each client to use its respective UDP socket to execute a packet exchange protocol, the packet exchange protocol comprising the following sub-steps:
    sending first messages to each of the first client and the second client, the first messages instructing the first client and the second client to each send second messages to target IP addresses and ports specified by the server, wherein a second message is a packet, wherein, for a respective one of the clients, the target IP addresses and ports specified by the server are associated with at least a first target location and a second target location, wherein each of the first and second target locations has a communication channel to the server over which information about a second message received at the respective target location is forwarded back to the server as a reflection packet, the information including a source address and port of the client as seen by a machine at the target location;
    receiving the information;

based on the information received and the respective client's local IP address and port number associated with the UDP socket, determining an associated Internet access type for each respective client;

executing a tunnel setup protocol, the tunnel setup protocol comprising the following sub-steps;

for each of the first and second clients, and based on the Internet access type for the respective client as determined by the packet exchange protocol, predicting a port range that the respective client will use to send subsequent messages; and instructing each respective client about the predicted port range of the other client so that the first client and the second client can start exchanging data directly through the tunnel and without passing through the server.

2. The method as described in claim 1 further including:

if the tunnel setup protocol does not succeed, instructing the first and second clients to communicate with one another via a relay node.

3. The method as described in claim 2 wherein the first and second clients communicate with the relay node using communications that are one of: TCP-based, UDP-based, SSL-based, and HTTP-based.

4. The method as described in claim 1 further including:

determining whether a given one of the first and second clients remains actively connected to the tunnel; and if, based on the determination, the given client is not then actively connected to the tunnel, providing to the other client a status indication.

5. The method as described in claim 4 wherein the status indication indicates whether a session between the first and second clients as mediated by the server was terminated intentionally or unexpectedly.

6. The method as described in claim 1 wherein the packet exchange protocol is UDP-based.

7. The method as described in claim 1 wherein the tunnel setup protocol comprises, for a given client:

instructing the given client to send a packet to the other client; and receiving a reflection packet from the other client to enable the server to confirm that the tunnel is operational in a given direction.

8. The method as described in claim 1 wherein the tunnel setup protocol comprises, for each client:

instructing each client to send a packet to the other client; and receiving reflection packets to enable the server to confirm that the tunnel is operational in both directions.

9. The method as described in claim 1 wherein the tunnel setup protocol comprises:

generating at least one script that includes a set of steps, the steps comprising at least one of: a first step that updates a given client IP address/port information, a second step that predicts an external IP address and port that a given client will use for the tunnel, a third step that prepares the tunnel for communication, and a fourth step that confirms the operation of the tunnel.

10. The method as described in claim 1 wherein the tunnel setup protocol comprises:

generating a set of one more scripts, each script including a set of steps that are carried out by the server to attempt to establish the tunnel between the first and second clients; and beginning with the first script and continuing until the tunnel is established or there are no more scripts:

executing each step in the set of steps; and if a given step fails, advancing to a next script.

11. The method as described in claim 10 wherein the set of steps comprises at least one of: a first step that updates a given client IP address/port information, a second step that predicts an external IP address and port that a given client will use for the tunnel, a third step that prepares the tunnel for communication, and a fourth step that confirms the operation of the tunnel.

12. Server apparatus to facilitate communications between a first client computer protected by an associated traffic policing device, and a second client computer, the server apparatus being distinct from the first client computer and the second client computer, comprising:

a processor;

a computer memory holding computer program instructions which when executed by the processor perform a method comprising:

receiving, from each client, a local IP address and port number associated with a UDP socket that the client has opened and to which it has bound;

instructing each client to use its respective UDP socket to execute a packet exchange protocol by which the server apparatus determines an associated Internet access type for each client, the packet exchange protocol comprising the following sub-steps:

sending first messages to each of the first client and the second client, the first messages instructing the first client and the second client to send second messages to target IP addresses and ports specified by the server apparatus, wherein a second message is a packet, wherein, for a respective one of the clients, the target IP addresses and ports specified by the server apparatus are associated with at least a first target location and a second target location, wherein each of the first and second target locations has a communication channel to the server apparatus over which information about a second message received at the respective target location is forwarded back to the server apparatus as a reflection packet, the information including a source address and port of the client as seen by a machine at the target location;

receiving the information;

based on the information received and the respective client's local IP address and port number associated with the UDP socket, determining an associated Internet access type for each respective client;

instructing each of the first and second clients to execute a tunnel setup protocol, the tunnel setup protocol comprising the following sub-steps;

for each of the first and second clients, and based on the Internet access type for the respective client as determined by the packet exchange protocol, predicting a port range that the respective client will use to send subsequent messages; and instructing each respective client about the predicted port range of the other client so that the first client and the second client can start exchanging data directly through the tunnel and without passing through the server.

13. The server apparatus of claim 12 wherein the tunnel between the client computer and the second client computer is a VPN.

14. The server apparatus of claim 12 wherein the at least one characteristic of the associated traffic policing device is a mapping algorithm that is one of: static, port_n, port_burst, port_random and addr_random, wherein static means that an external port used depends only on an internal address and port number, port_n means that the external port used changes in fixed increments, port_burst means that the external port used changes in random increments, port_random means that the external port used is selected randomly, and addr_random means that both the external port and IP address for the client are change for new destination.

15. The server apparatus of claim 12 wherein the at least one characteristic of the associated traffic policing device is a state of a firewall.

16. The server apparatus of claim 15 wherein the state of the firewall is open or stateful.

17. The method as described in claim 1 wherein the packet exchange protocol includes predicting an IP address range that the respective client will use to send subsequent messages.

18. The server apparatus as described in claim 12 wherein the packet exchange protocol includes predicting an IP address range that the respective client will use to send subsequent messages.

* * * * *